(12) United States Patent
Egorov et al.

(10) Patent No.: US 11,755,929 B2
(45) Date of Patent: Sep. 12, 2023

(54) SYSTEM AND METHOD FOR TIME SERIES PATTERN RECOGNITION

(71) Applicant: Financial Industry Regulatory Authority, Inc., Washington, DC (US)

(72) Inventors: Alexey Egorov, Washington, DC (US); Chi-Keung Chow, Washington, DC (US); Raghu Raman, Washington, DC (US); Madhukesh Siddalingaiah, Washington, DC (US); Susan Tibbs, Washington, DC (US)

(73) Assignee: Financial Industry Regulatory Authority, Inc., Washington, DC (US)

( * ) Notice: Subject to any disclaimer, the term of this patent is extended or adjusted under 35 U.S.C. 154(b) by 0 days.

(21) Appl. No.: 15/929,653

(22) Filed: May 14, 2020

(65) Prior Publication Data
US 2021/0357772 A1    Nov. 18, 2021

(51) Int. Cl.
*G06N 5/04* (2023.01)
*G06N 20/00* (2019.01)
*G06F 16/25* (2019.01)
*G06Q 30/018* (2023.01)
*G06Q 30/0201* (2023.01)

(52) U.S. Cl.
CPC ............ *G06N 5/04* (2013.01); *G06F 16/258* (2019.01); *G06N 20/00* (2019.01); *G06Q 30/0185* (2013.01); *G06Q 30/0201* (2013.01)

(58) Field of Classification Search
CPC ........ G06N 5/04; G06N 20/00; G06F 16/258; G06Q 30/0185; G06Q 30/0201
See application file for complete search history.

(56) References Cited

U.S. PATENT DOCUMENTS

| | | | |
|---|---|---|---|
| 2018/0012239 A1* | 1/2018 | Studnitzer | G06N 20/00 |
| 2019/0325340 A1* | 10/2019 | Nitta | G06N 20/00 |
| 2019/0379589 A1 | 12/2019 | Ryan et al. | |
| 2020/0151565 A1* | 5/2020 | Widerhorn | G06N 5/003 |

OTHER PUBLICATIONS

Tsantekidisa, Avraam, et al. "Using Deep Learning for price prediction by exploiting stationary limit order book features." arXiv preprint arXiv:1810.09965 (2018). (Year: 2018).*

Leangarun, Teema, Poj Tangamchit, and Suttipong Thajchayapong. "Stock price manipulation detection using generative adversarial networks." 2018 IEEE Symposium Series on Computational Intelligence (SSCI). IEEE, 2018. (Year: 2018).*

(Continued)

*Primary Examiner* — Markus A. Vasquez
(74) *Attorney, Agent, or Firm* — FINNEGAN, HENDERSON, FARABOW, GARRETT & DUNNER, LLP

(57) ABSTRACT

Systems and methods identify a behavior in multivariate time-series data. The systems and methods receive data representing a time series having steps each representing an event associated with a time stamp and being associated with one or more attributes; transform the data into a tensor; train a model using training data comprising a set of tensors; identify the behavior using predictions from the trained model and a target pattern; and provide an indication of the presence or absence of the behavior.

26 Claims, 24 Drawing Sheets

(56) References Cited

OTHER PUBLICATIONS

Zhai, Jia, Yi Cao, and Xuemei Ding. "Data analytic approach for manipulation detection in stock market." Review of Quantitative Finance and Accounting 50.3 (2018): 897-932. (Year: 2018).*
Tashiro, Daigo, et al. "Encoding of high-frequency order information and prediction of short-term stock price by deep learning." Quantitative Finance 19.9 (2019): 1499-1506. (Year: 2019).*
Yoshua Bengio et al., *Representation Learning: A Review and New Perspectives*, 35.8 IEEE Trans. Pattern Anal. Mach. Intell. 1798-1828 (Aug. 2013), http://dx.doi.org/10.1109/TPAMI.2013.50.
Quanming Yao et al., *Taking Human out of Learning Applications: A Survey on Automated Machine Learning*, CoRR (2018), http://arxiv.org/abs/1810.13306.
International Search Report, International Application No. PCT/US2021/032389 for Financial Industry Regulatory Authority, Inc., dated Aug. 11, 2021 (11 pages).
Mohammed Ali et al., "Clustering and Classification for Time Series Data in Visual Analytics: A Survey," IEEE Access, vol. 7, Dec. 10, 2019, pp. 181314-181338 (25 pages).

* cited by examiner

1500

SYSTEM AND METHOD FOR TIME SERIES PATTERN RECOGNITION

TECHNICAL FIELD

This invention relates to systems and methods for time-series pattern recognition.

BACKGROUND

Conventional systems for identifying patterns in time-series data rely on a combination of feature extraction and classification. Feature extraction is time consuming and labor intensive, and accurately capturing features is either computationally costly or requires losing information. Further, conventional feature extraction relies on human engineering, which may introduce human bias into the process.

There is a need for a faster and more efficient way to identify patterns in multivariate time-series data.

SUMMARY

A system for identifying a behavior in multivariate, time-series data comprises an input device to provide the data; an output device to provide an indication of the behavior; a memory device storing instructions to identify a pattern; and a processor to execute instructions. The instructions cause the system to receive data representing a time series having steps, each representing an event associated with a time stamp and being associated with an attribute; transform the data into a tensor; train a model using training data having a set of tensors; identify the behavior using predictions from the trained model and a target pattern; and provide an indication of the presence or absence of the behavior.

A method for identifying a behavior in multivariate time-series data comprises receiving data representing a time series having steps each representing an event associated with a time stamp and being associated with an attribute; transforming the data into a tensor; identifying the behavior using predictions from the trained model and a target pattern; and providing an indication of the presence or absence of the behavior.

A computer-readable medium includes instructions configured to cause at least one processor to perform a method including receiving data representing a time series having steps each representing an event associated with a time stamp and being associated with an attribute; transforming the data into a tensor representing the number of time steps of the time series, the number of time series in the data, and the number of attributes in the data; training a model using training data having a set of tensors; identifying the behavior using predictions from the trained model and a target pattern; and providing an indication of the presence or absence of the behavior.

The detailed description describes certain embodiments of the invention.

BRIEF DESCRIPTION OF THE DRAWINGS

The accompanying drawings, which are part of this specification, illustrate representative embodiments and, together with the description, explain the principles of the invention. In the drawings.

DETAILED DESCRIPTION

Figure 1A:
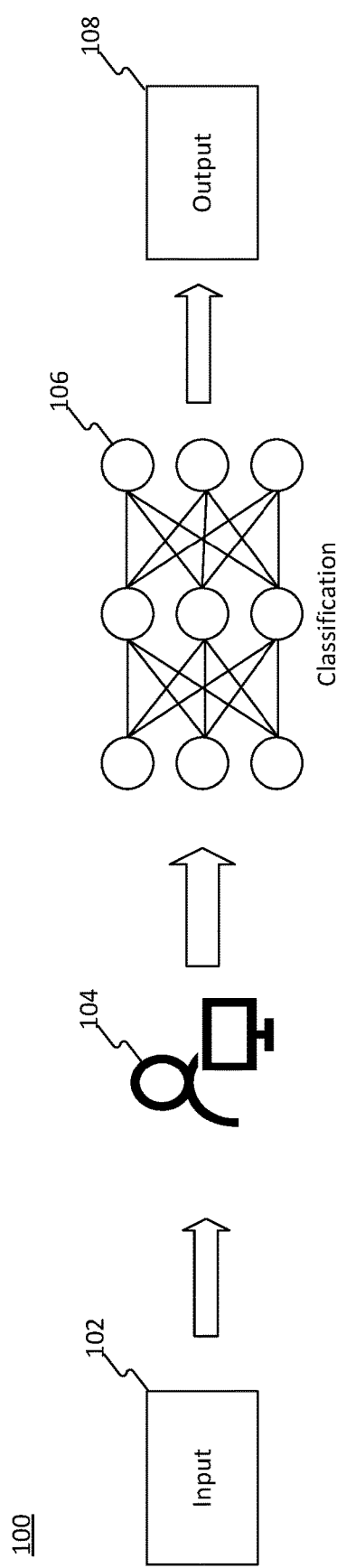
FIG. 1A is a block diagram of a method for identifying patterns consistent with invention for identifying patterns.

The systems and methods of this invention are useful for pattern recognition in multivariate time series. These systems and methods are very useful to identify suspicious and potentially fraudulent behaviors.

Market surveillance may include detecting examples of known violations by using transactional data from firms and exchanges. The data may include order events (e.g., new orders, executions, cancellations, etc.), consolidated feeds (e.g., protected best bid and offer (PBBO)), and reference data. The data may be stored in corresponding database tables by type or source.

Detecting a known violation requires finding a combination of different types of events arranged in a specific order in time. A process that finds one type of violation is called a surveillance pattern, which can identify time-series data suggesting improper market manipulation.

Market surveillance represents an example of addressing a multivariate, time-series pattern recognition problem. In such a problem, the data set may include observations or events that each represents a value of a single random variable at a certain time. The events may occur at equal or unequal time intervals. Each observation or event in the time series may have multiple attributes. For example, orders have price, quantity, side, etc. Market surveillance based on analysis of time-series data often relies on analysis of more than one type of object, such as a combination of trade orders and executions.

The universe of market data consists of a set of time series $$U=\{S^k : k=1,\ldots,n\}$$

in which each time series is represented as $S^k=\{S_t^k : t \in T\}$, where T is a set of time steps. Each time series may be broken into individual time steps:

$$S^k=\{S_t^k : t \in T\}=\{S_{t_1}^k, \ldots S_{t_m}^k : t_1 < \ldots < t_m\}$$

At each time step t, the market transaction can be represented a vector of attributes:

$$S_{t_1}^k=(s_{t_1,1}, \ldots, s_{t_1,r})^T$$

This universe, U, may be shaped into a three dimensional structure along the dimensions of time-series type, time steps t, and attributes r.

Traditional systems and methods for pattern recognition use a combination of feature engineering and rules that require extensive human input, are time consuming, and introduce bias into feature extraction.

A traditional method for feature extraction includes the steps of: selecting a target object, engineering features, and applying thresholds to the features. A surveillance pattern may select a target time series, which will become a basis for a final set of observations. Order executions, such as an executed buy or sell orders, are a frequent choice of target object for a surveillance pattern. For each element of that basis time series, a surveillance pattern adds fields, called "features," that describe context or summarize elements of other time series.

For each execution, the surveillance pattern calculates a feature representing the number of orders relevant to that execution. In this way, the features replace large amounts of "raw" time series with a smaller number of fields. Features also eliminate the order of the events in the final set of observations.

Next, the system may apply thresholds to the features. The surveillance pattern may apply a rule to one observation, or event, at a time. A rule is a Boolean function that uses fields of the observation to predict whether that observation is an example of a pattern associated with some target event or behavior, for example, a violation. As an example, an observation may find a violation if there are more than five corresponding order cancellations and the prevailing PBBO at the execution is better than the price before the first order event.

During feature extraction, the multiple time-series data may be converted into a single unordered set of observations. First, a basis time series, $S^b$, may be selected from a universe: $S^b \in U$. Then a set of features may be generated as:

$$S^b \Rightarrow F=\{F_i : i=1, \ldots, m^b\},$$

where each feature, $F_i$, is:

$$F_i = S_{t_1}^b \cap f(t_i, U)$$

$f(t_i, U)$ is a function that calculates features augmenting the basis observation $S_{t_1}^b$. This function can use the entire universe U or just events local to $t_i$. Traditionally, the separation of features and rules was implicit in surveillance pattern logic, but not explicitly defined until after the introduction of machine learning (ML).

The use of ML in the pattern-recognition process separated feature engineering and rules by replacing the rules with an ML classifier trained in a supervised fashion. However, the surveillance patterns still rely on calculating a significant amount of features. It is faster and easier to develop new pattern rules and adjust pattern thresholds because a classifier based on training sets performs those functions automatically. Implicitly defining and calculating "features" also makes it possible to run ML methods besides classification. For example, the market data can be clustered using a k-means algorithm operating on the features. Other calculations may be performed on the data using other supervised and unsupervised methods.

FIG. 1A is a diagram of a conventional method 100 of pattern recognition. A system may receive input 102, which may be time-series or other raw data. The time-series data may include a number of events occurring over a time interval, where each event is associated with one or more attributes. A user 104 may generate a set of rules defining features of the input data. Based on the defined features, a ML component 106 of the system may analyze the time-series data to classify the data as either including or not including a pattern based on the generated features. The output 108 may be a binary classifier or other output indicative of whether or not a pattern is identified in the input data.

Although feature engineering presents the benefits of applying human expertise and replacing large amounts of information with fewer features, feature engineering may introduce human bias, result in loss of information, and involve significant labor.

Conventional methods of feature extraction require significant amounts of data preparation, for example, to get a time series stationary, are prone to inaccuracy, and are difficult to implement. Other conventional methods of feature extraction may implement machine learning, but may be limited, for example, to in-row calculations.

Figure 1B:
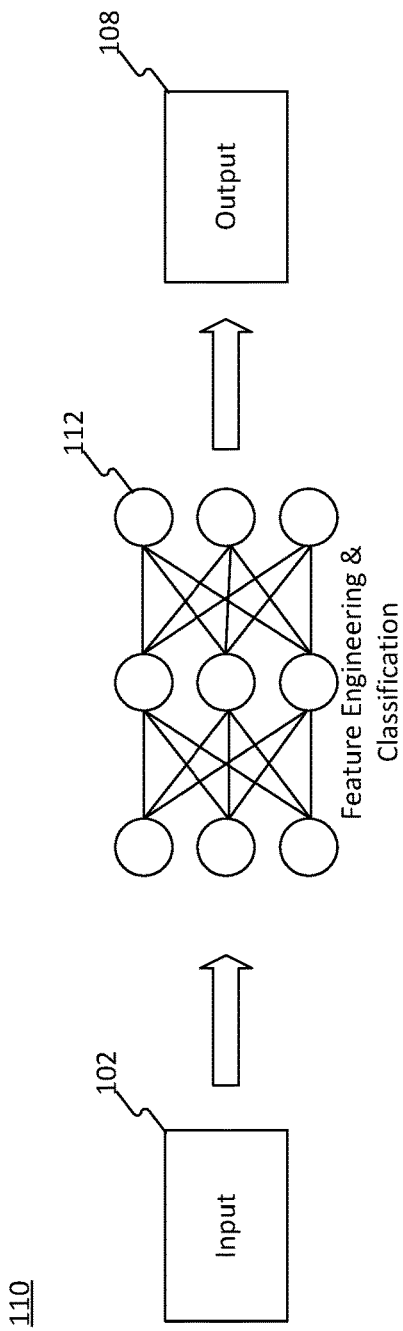
FIG. 1B is a block diagram of another method for identifying patterns consistent with invention for identifying patterns.

FIG. 1B is an illustration of a method 110 for identifying a pattern in multivariate time-series data, consistent with disclosed embodiments. In method 110, input data 102 may be transformed into a tensor and input directly to a ML component 112. The ML component 112 may be configured to use one or more image analysis techniques to perform feature extraction and classification on the tensor data. The output 108 of the ML component 112 may include a classification of the input data as matching or not matching a pattern. For example, the input data may be classified as matching a pattern indicative of a market manipulation behavior.

Because method 110 does not require feature engineering and only reads data once, it requires less time to run. Further, pattern-recognition using method 110 is less expensive to develop than methods requiring labor-intensive feature extraction.

Figure 2:
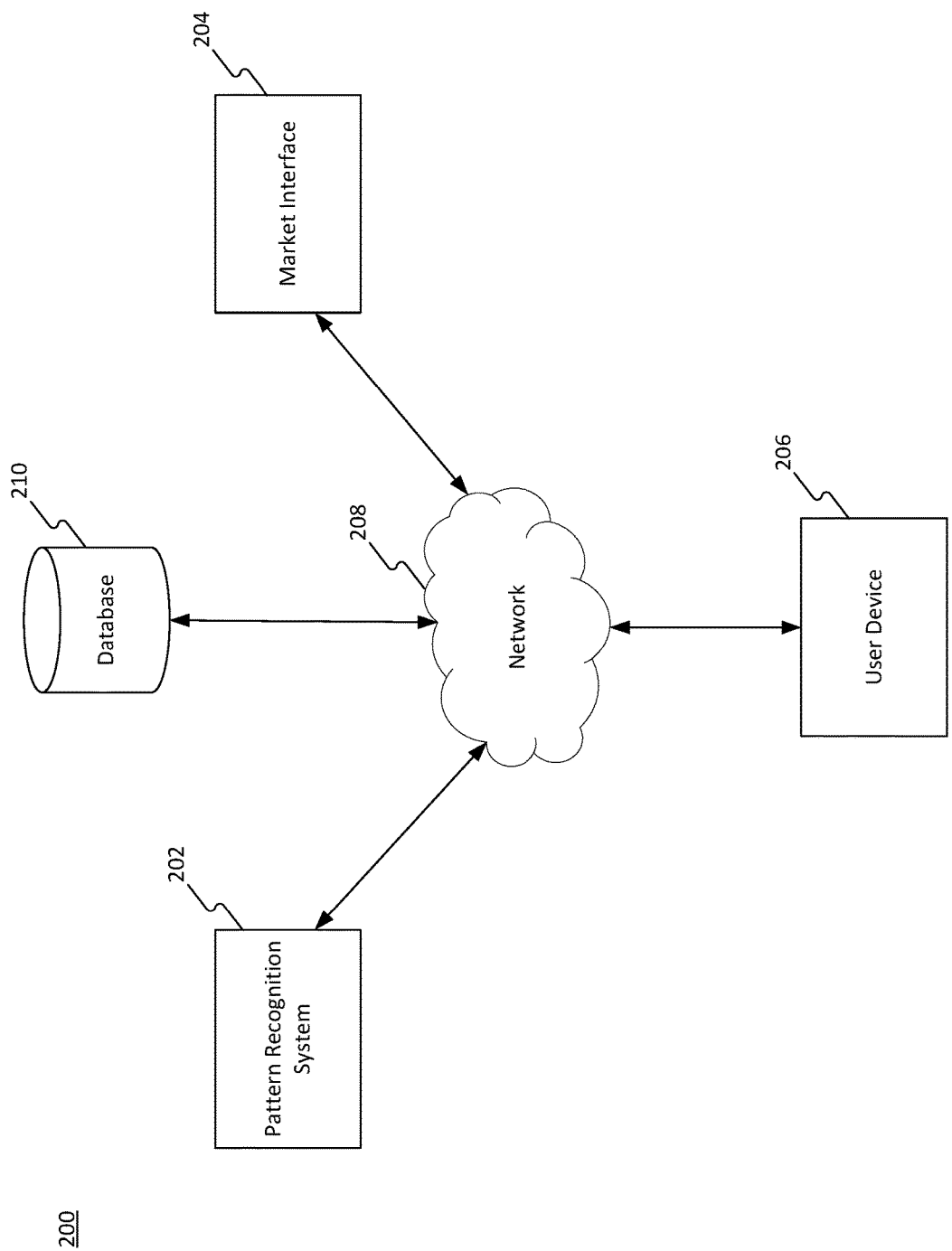
FIG. 2 is a block diagram of a system consistent with the invention for pattern recognition.

FIG. 2 is a block diagram of an exemplary system 200 that can implement the invention. System 200 includes a pattern-recognition system 202, a market interface 204, one or more user devices 206, a network 208, and a database 210. The components of system 200 may connect to a network 208, as in FIG. 2, or may connect directly with each other.

Pattern recognition system 202 may be a computing system for analyzing and monitoring data from market interface 204 or user device 206. System 202 uses processed market data to train a machine-learning algorithm to identify patterns in market data that may indicate behaviors consistent with market manipulation or fraud.

Market interface 204 may be a computing system for accessing stock markets, bond markets, currency exchange markets, futures markets, or commodities markets. Market interface 204 may inform pattern recognition system 202, user devices 206, or database 210 about market positions, and may receive instructions from pattern recognition system 202 or user device 206. Market interface 204 may also provide access using protocols such as FIX, FAST, HSVF, SAIL, SBE, UTP Direct, OUCH, ITCH, HTTP, FTP, Millennium.

User device 206 may also be a computing system, such as a smartphone, tablet, phablet, desktop, laptop, or server. Device 206 may enable a user to input or receive data from pattern recognition system 202 and may display information associated with recognized patterns detailing suspicious behaviors that pattern recognition system 202 identifies.

Database 210 may be a relational database storing market data processed market data (e.g., tensor data, and models for identifying patterns indicating behaviors. Database 210 may include cloud-based databases (e.g., Amazon Web Services S3 buckets), or on-premises databases, Oracle™ databases, Sybase™ databases, or other relational or non-relational databases, such as Hadoop™ sequence files, HBase™, or Cassandra™. Database 210 may include computing components (e.g., database-management system, database server, etc.) to receive and process requests for data stored in memory devices of the database and to provide data from the database.

Although FIG. 2 shows pattern recognition system 202, market interface 204, user device 206, network 208, and database 210 as different components, one or more of these components may be consolidated into fewer computing systems.

The configuration and boundaries of the functional building blocks of system 100 are not crucial to the invention. Alternative boundaries are possible if the components perform the specified functions and have the relationships described.

Figure 3:
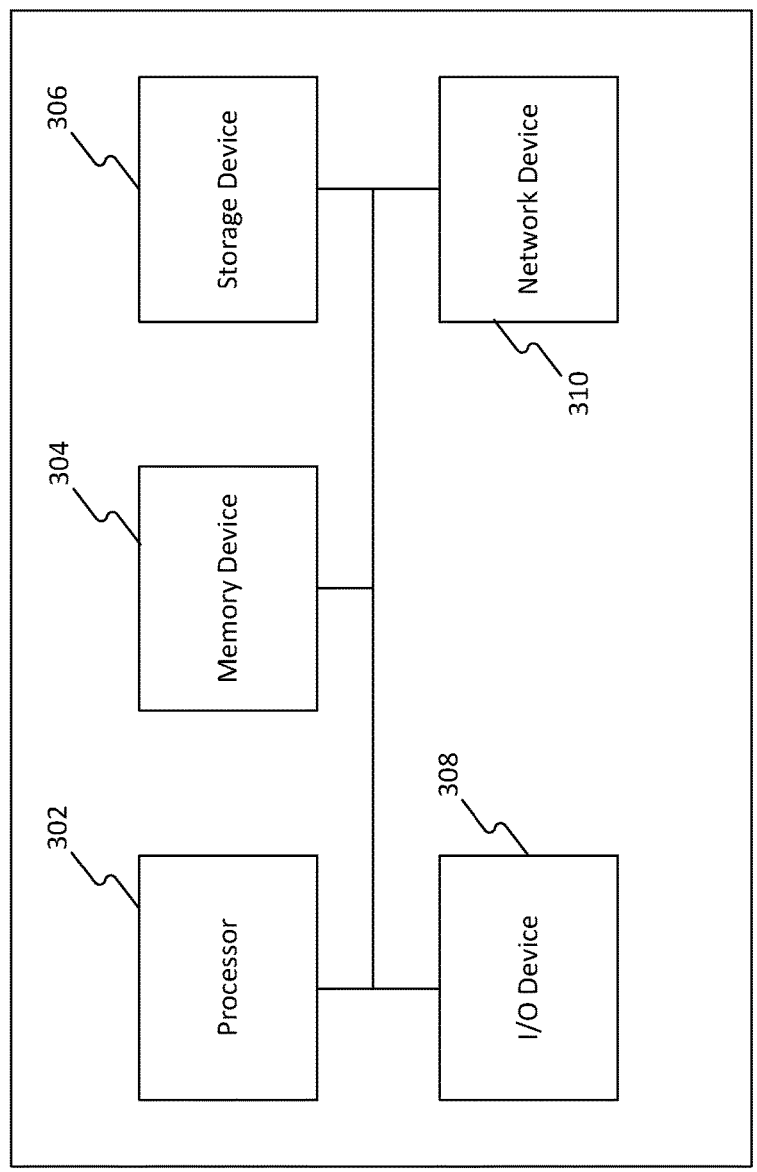
FIG. 3 is a block diagram of a computing device that can implement the invention.

FIG. 3 is a block diagram of a computing device 300 consistent with the present invention that may implement one or more of the components in FIG. 2. Computing device 300 may include one or more processors 302, one or more memory devices 304, one or more storage devices 306, one or more input/output (I/O) devices 308, and one or more network devices 310. Computing device 300 may also include mobile computing devices, such as smartphones or tablets, general-purpose computers, or any combination of these components. While depicted in singular form in FIG. 3, each component in computing device 300 may also be multiple systems.

Processor 302 may include one or more processing devices, such as mobile device microprocessors manufactured by Intel, NVIDIA, or other manufacturers.

Memory device 304 may include one or more storage devices configured to store instructions used by processor 302 to perform functions described below. Memory device 304 may include a random-access Memory (RAM), flash memory, or the like. Memory devices 304 store instructions that processor 302 executes to perform the operations described in this specification. The disclosed embodiments are not limited to separate programs or computers to perform dedicated tasks. Memory device 304 may include a single program or multiple programs that shape market data and identify patterns.

Storage device 306 may include one or more devices configured to store data consistent with the invention. Device 306 may include a hard disk or flash memory storing market data.

I/O device 308 allows receipt and transmission of data by computing device 300. I/O device 308 may include input devices such as a keyboard, a mouse, a touchscreen, a microphone, or a camera, as well as systems and components to enable those devices to provide input to computing device 300 (e.g., USB ports and associated chipset). I/O device 308 may also include output devices such as a monitor, a printer, or speakers, as well as systems and components to enable those devices to provide input to computing device 300 (e.g., a graphics card/chipset, sound card, and USB ports and associated chipset).

Network device 310 may include devices configured to communicate data to other components of system 200. Such as a router, a modem, an Ethernet adapter, or a wireless network adapter (e.g., IEEE 802.11).

Each component in FIG. 3 may connect to each other directly or via buses. A computing system may comprise one or more computing devices 300 (e.g., in a cluster of devices).

Figure 4A:
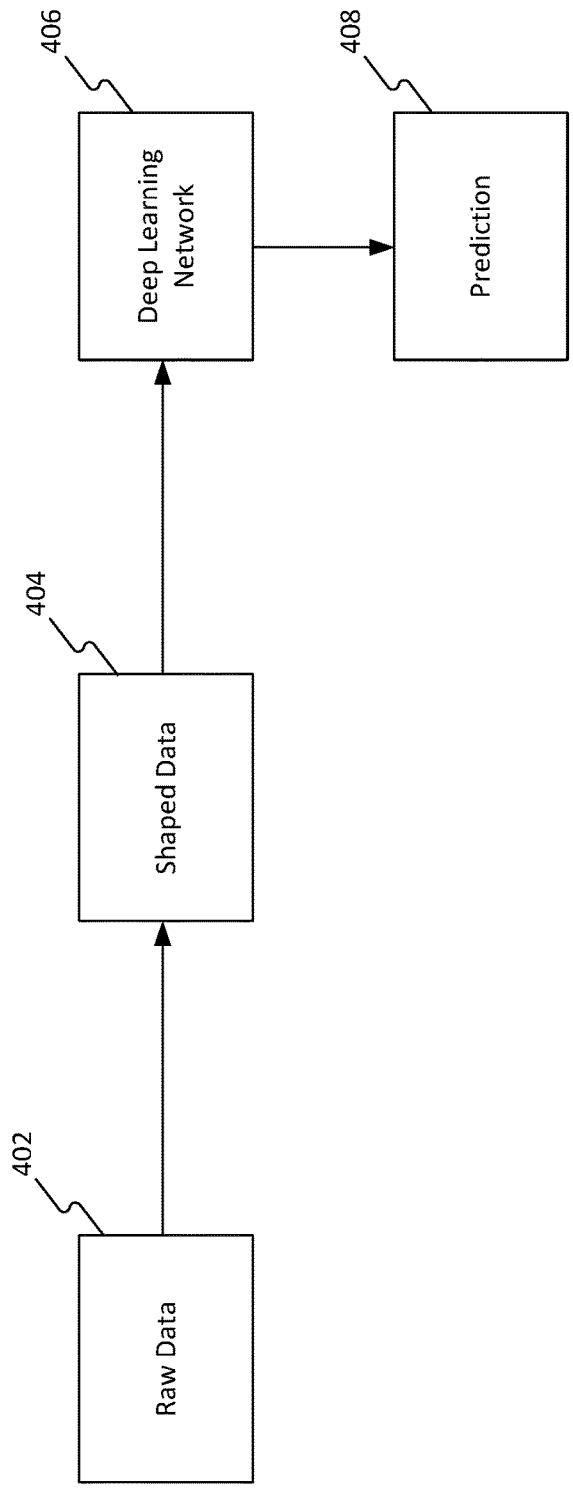
FIG. 4A is a process consistent with the invention for pattern recognition.

FIG. 4A illustrates a process 400 for performing pattern recognition on time-series data, consistent with this invention. Pattern-recognition system 202 or device 300 can perform process 400.

At step 402, the system receives raw data, which may include multivariate time-series data indicative of events occurring during a time interval. The raw data may come from market interface 204 and be received in real or near real time.

At step 404, the system may shape the raw data into a format suitable for pattern recognition. For example, the time-series data may be converted into tensors. The raw data, which is usually stored in database tables or in a relational database, may be transformed into a three-dimensional structure. That structure can accommodate different kinds of time series (e.g., orders, trades, news events, etc.). The tensor enables the data to be analyzed using methods similar to those used in image-recognition problems At step 406, the system may send the shaped data, e.g., the generated tensor, to a deep learning network, such as a convolutional neural network (CNN). The deep learning network may identify data having a shape matching that of a predetermined pattern indicating a behavior of interest.

At step 408, the deep-learning network may predict whether the input data indicates a pattern. For example, the deep learning network may be configured to identify gaming or spoofing behaviors by a market participant. The deep learning network may output its prediction as a binary classifier (i.e., yes or no).

Figure 4B:
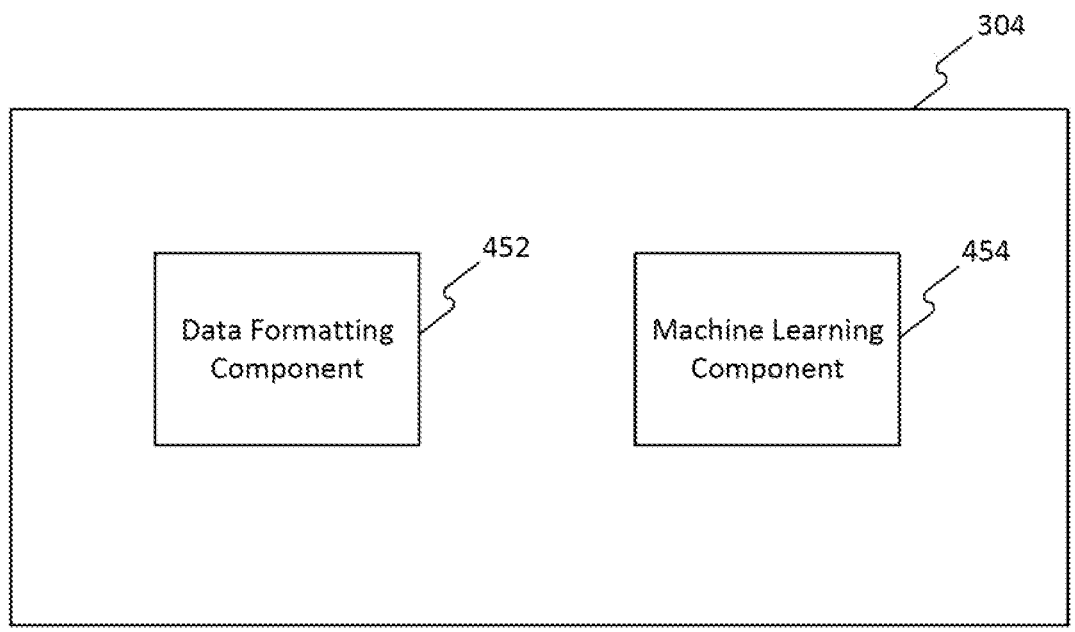
FIG. 4B is a block diagram of a memory containing instructions for the process in FIG. 4A.

FIG. 4B illustrates an embodiment of a memory device 304 containing software components consistent with the present disclosure. The software components of memory device 304 may be configured to execute a process, e.g., process 400, to perform pattern recognition on time-series data. Memory device 304 includes data-formatting component 452 and machine-learning component 454. Components 452 and 454 may contain software instructions for execution by a processing device, e.g., processor 302 in pattern recognition system 202. Data- formatting component 452 and machine-learning component 454 may cooperate to generate tensor data from market data, train models to classify patterns in time-series data, and apply the trained model to market data.

Data-formatting component 452 may receive market data, for example from market interface 204. That data can be multivariate time-series data. Component 452 may transform raw data into a 3D data structure shown in FIG. 5.

Figure 5:
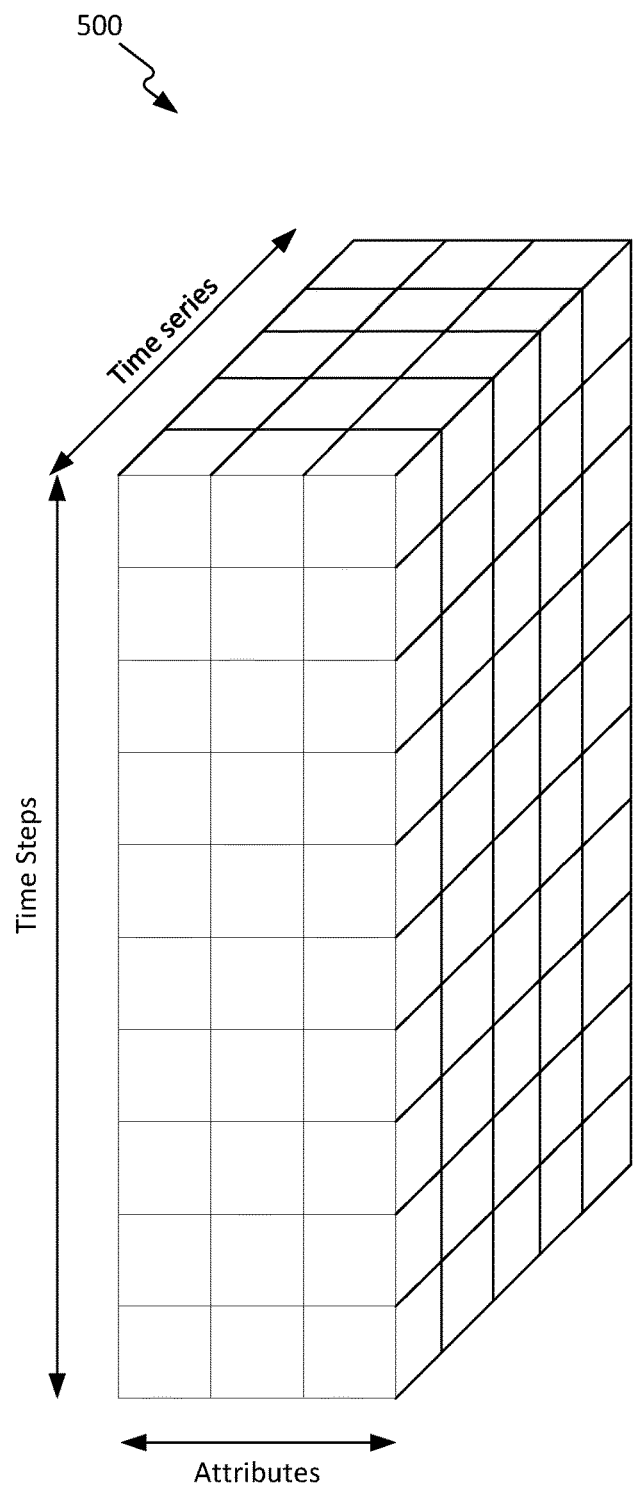
FIG. 5 is an illustration of a tensor.

FIG. 5 is an example of a 3D data structure 500, which may be a tensor having dimensions to track the number of time series, number of time steps, and attributes of the input raw data. Shaping the data as a tensor may prepare the data for input to a ML or deep-learning network and enable the network to perform pattern recognition on the shaped data to determine whether the data matches a pattern.

Returning to FIG. 4B. data formatting component 452 may also be configured to prepare the raw data for transformation into a tensor. Component 452 may trim, pad, normalize or otherwise manipulate raw data to transform it into tensor data.

Figure 6A:
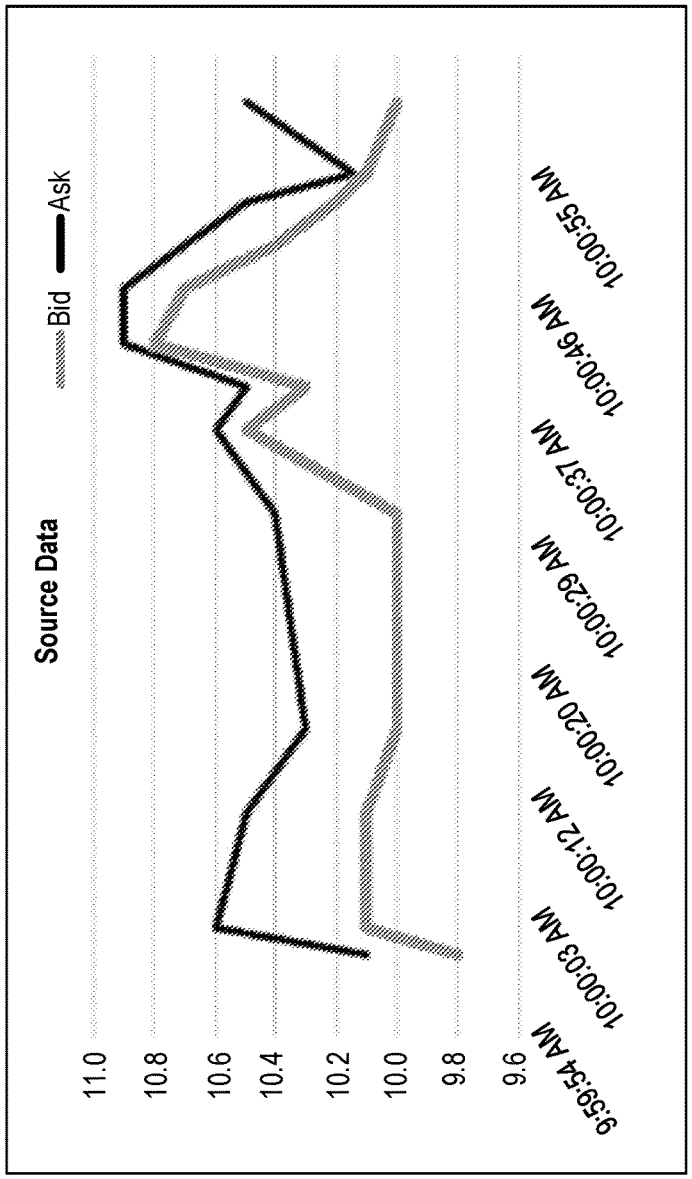
FIGS. 6A-6E illustrate data for the system in FIG. 2.

FIG. 6A is an example of raw data in table 600 and graph 602 that data formatting component 452 may receive. The raw data in FIG. 6A may include bid and ask data over a time interval. In this example, graph 602 plots bid and ask prices over time from 10:00:03 AM to 10:00:55 AM and includes thirteen data points.

Figure 6B:
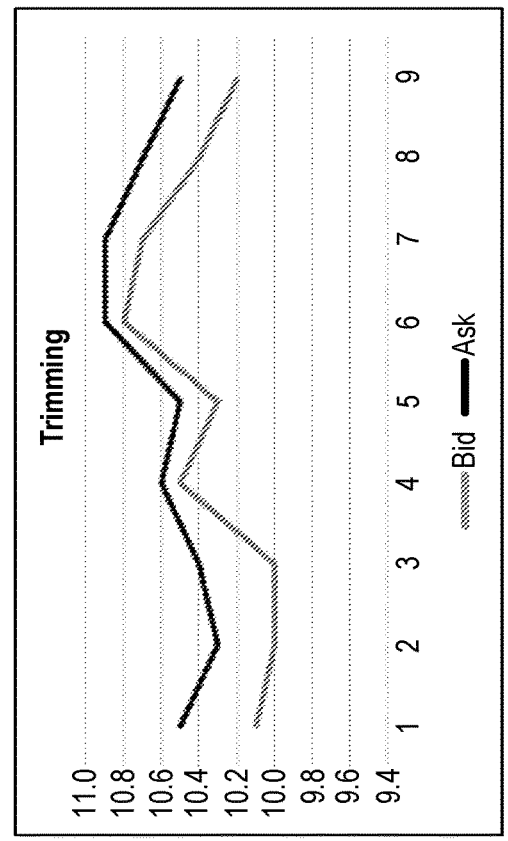

The number of transactions in the raw data may not fit the number of time steps in the input tensor from data formatting component 1452, so component 452 may trim the data from both ends, keeping the center of the one-minute time series and center of the tensor aligned. FIG. 6B shows the data after trimming the thirteen original data points to fit a nine-point window. Removing two data points from the beginning and two data points from the end of the series retains the center of the time series. Graph 606 shows the trimmed data.

Figure 6C:
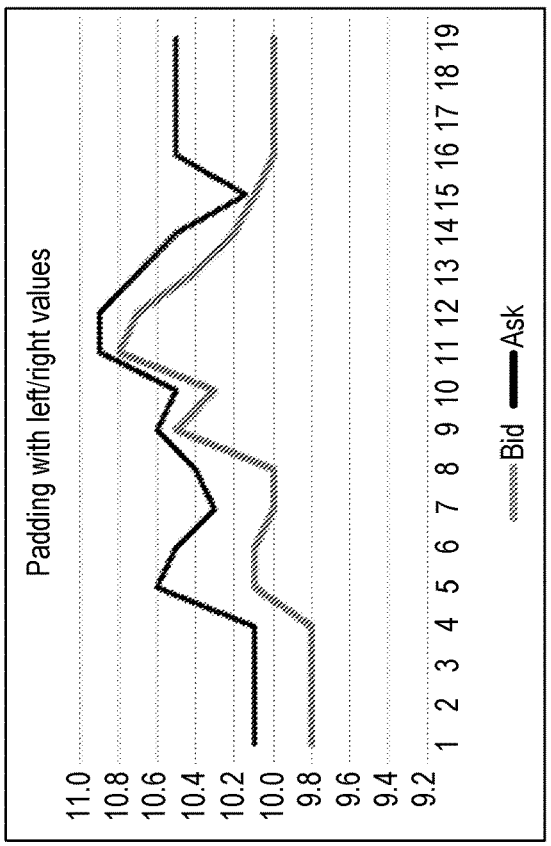

The raw data may also require padding it the number of transactions represented in the data is smaller than the number of time steps in the tensor. FIG. 6C shows the original data set contains thirteen data points, but the tensor has nineteen time steps, Data formatting component 452 may add three data points to the beginning and end of the time series with values equivalent to the first and last values of the time series, respectively as table 608 and graph 610 show.

Figure 6D:
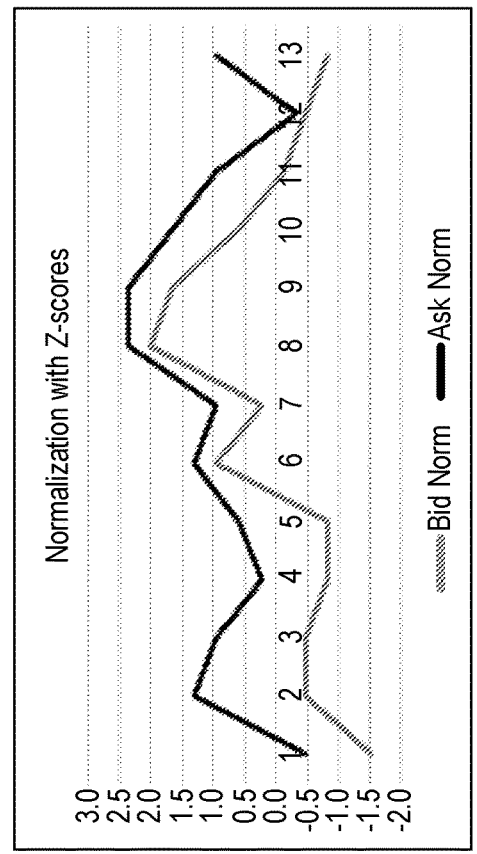

To achieve accurate training results, data formatting component 452 may normalize the raw data. FIG. 6D illustrates a table 612 and graph 614 of normalized data. The normalization can be based on z-score or min/max scaling. Table 612 and graph 614 illustrate data normalized based on z-score.

The raw data may include unequal time steps. Before passing the shaped data to machine learning component 454, data formatting component 452 may determine a time descriptor for the time series, which will be an attribute of the existing time series.

Figure 6E:
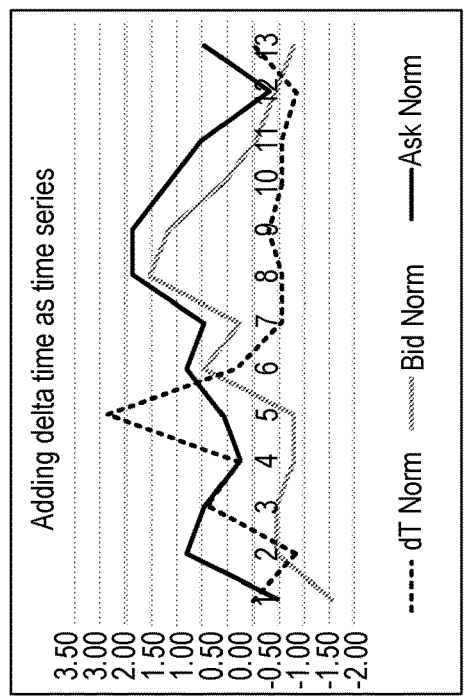

FIG. 6E shows time information encoded using time deltas defined as $dt_i=t_i-t_{i-1}$. Table 616 and graph 618 illustrate adding time to the raw data as a discrete time series. In other embodiments, time information may be encoded using the accumulated time since the beginning of the time window, where the accumulated time is $at_i=t_i-t_0$. Either method or a combination of these methods may be used to calculate a time descriptor, which may be added as another time series to the input tensor or as an additional attribute of an existing time series.

Data formatting component 452 may use any of these methods alone or in combination to prepare the raw data for ML component 454. Component 452 may also select which method to use based. for example, on the desired dimensions of the tensor that depend on the pattern to be identified or on empirical data.

Returning to FIG. 4B, machine-learning component 454 may receive the tensor data from data formatting component 452 and train a model to identify a pattern in time-series data based on the classification of positive and negative examples. Positive examples may display a pattern indicating a target behavior and be labeled with binary classifier "1" Negative examples may display patterns not indicating the behavior and be labeled with binary classifier "0."

Machine-learning component 454 may also include a convolutional neural network (CNN) built, for example, in Keras running on Tensorflow. The CNN may be a multilayer CNN layer model applied to the generated samples and may be trained to identify patterns indicating the behavior. In some embodiments, machine-learning component 454 implements feature learning using a CNN to learn characteristics of patterns or behaviors in a series of data. Machine-learning component 454 may use a deep-learning neural network to classify time-series data based on the patterns. The trained models may be stored in database 210.

Figure 7A:
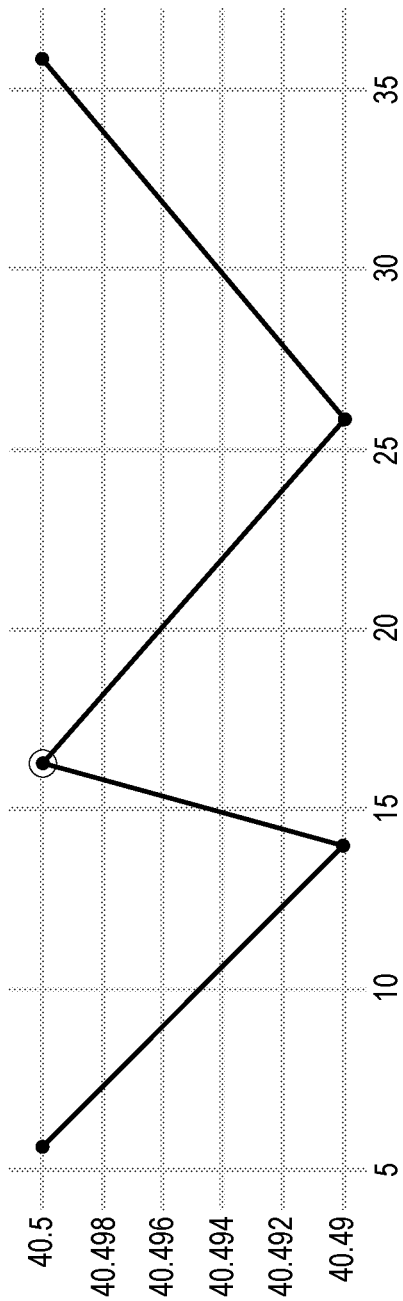
FIGS. 7A-7B illustrate sample data for the system in FIG. 2.
Figure 7B:
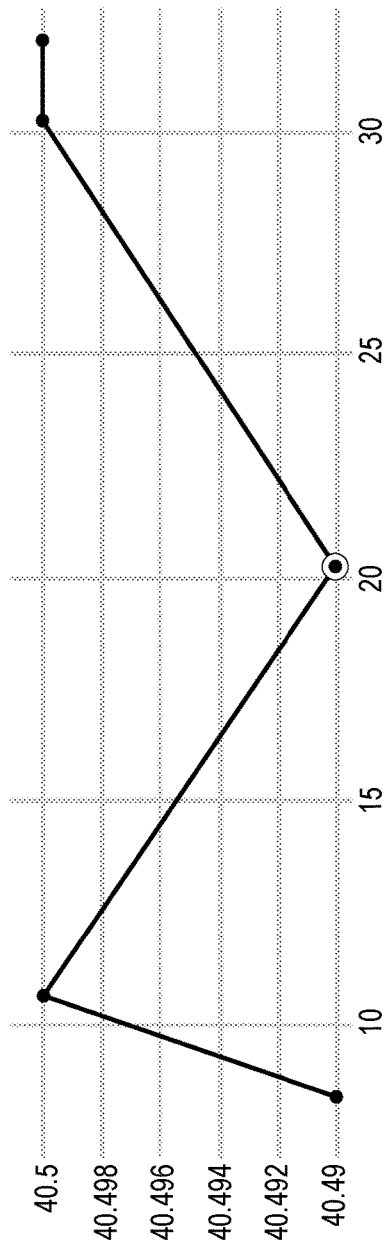
Figure 7B:
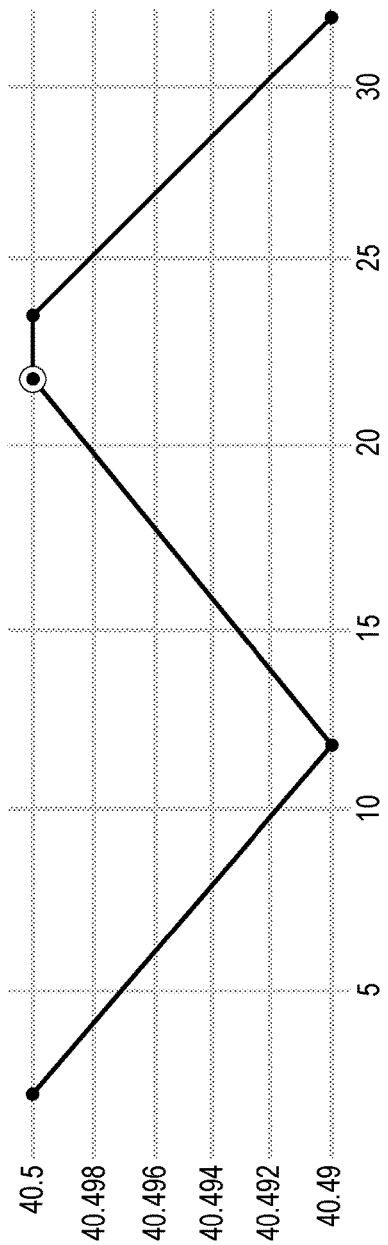

FIG. 7A illustrates a positive sample of data containing a price peak, which is a price of an order higher than the previous and next price. FIG. 7B illustrates negative samples of data that do not contain a price peak. Machine-learning component 454 may train a model using market data from market interface 204 that has been labeled with a rule detecting the price peak shape. A model trained on 600 positive samples and 600 negative samples has identified the price peak pattern with 99% accuracy.

Figure 8A:
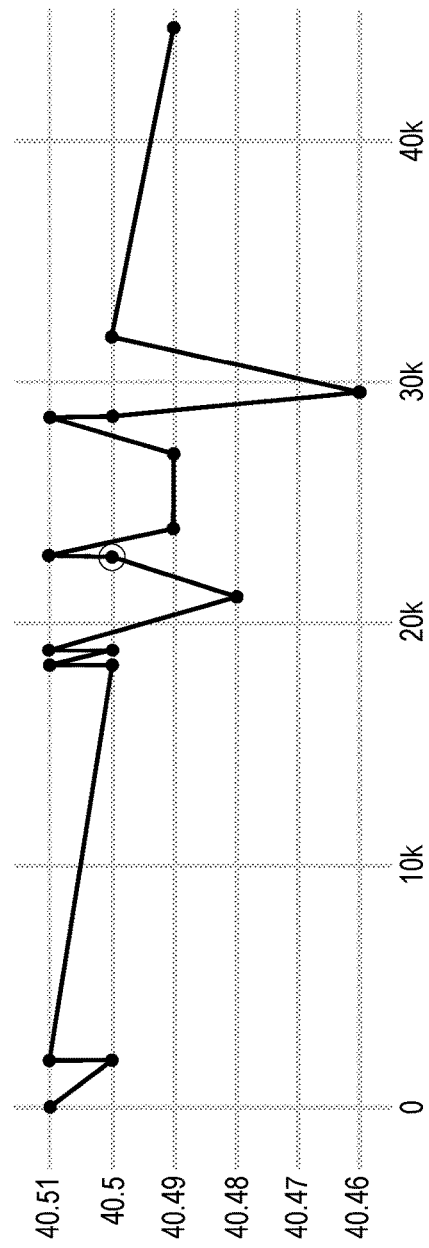
FIGS. 8A-8B illustrate sample data for the system in FIG. 2.
Figure 8B:
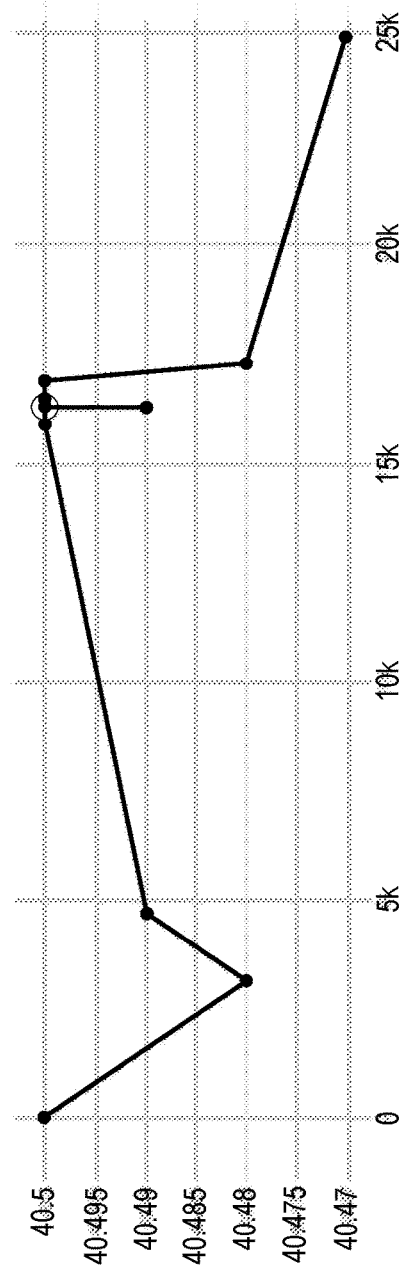

Machine-learning component 454 may also train models to identify other shapes in time-series data because this training method is not limited to the shape it is trained to detect. For example, a model may identify a trend-up shape where the price of an order is higher than the previous price and lower than the next price. FIG. 8A shows a positive sample of a trend-up shape. FIG. 8A shows a negative sample of a trend-up shape.

Figure 9A:
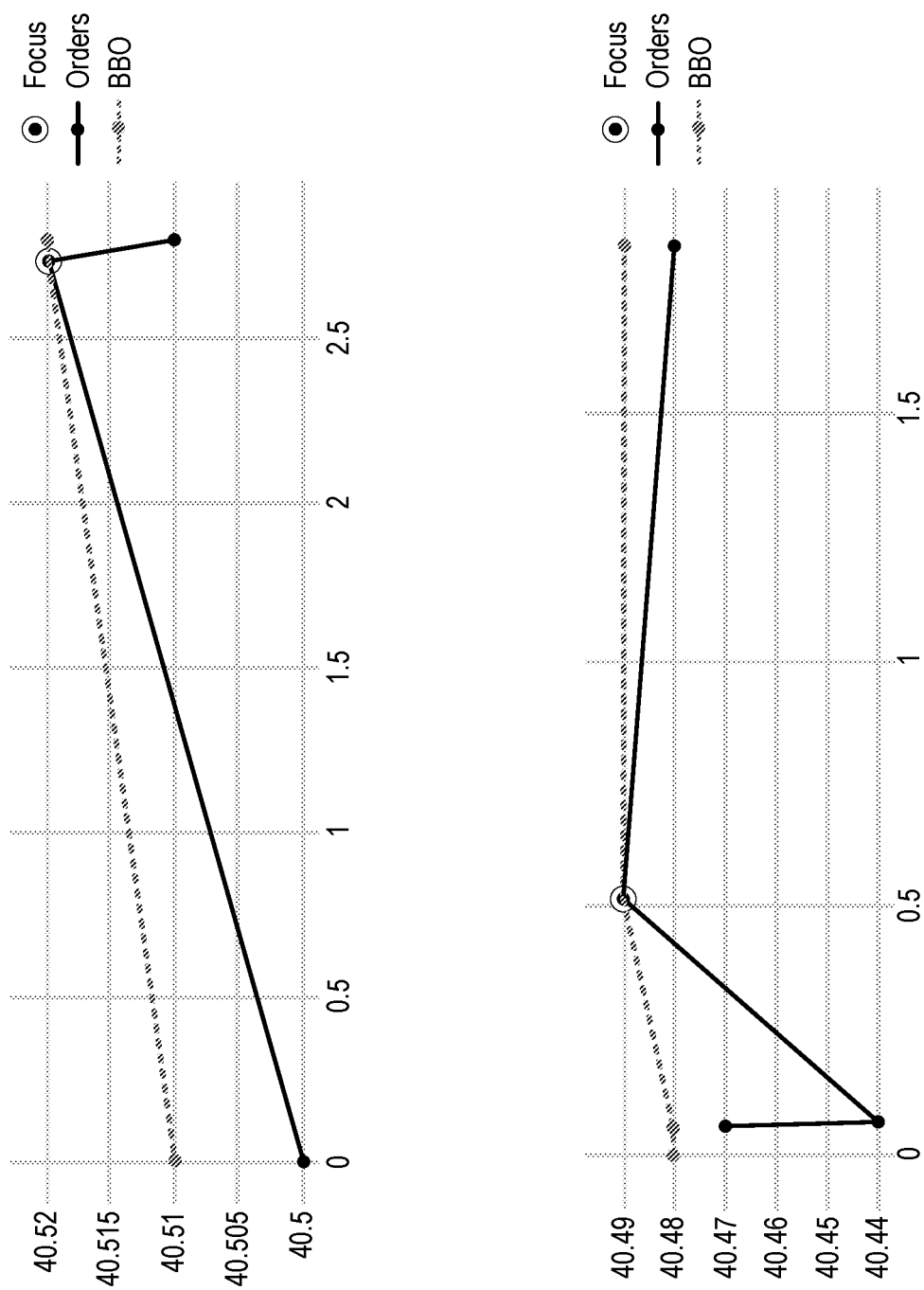
FIGS. 9A-9B illustrate sample data for the system in FIG. 2.
Figure 9B:
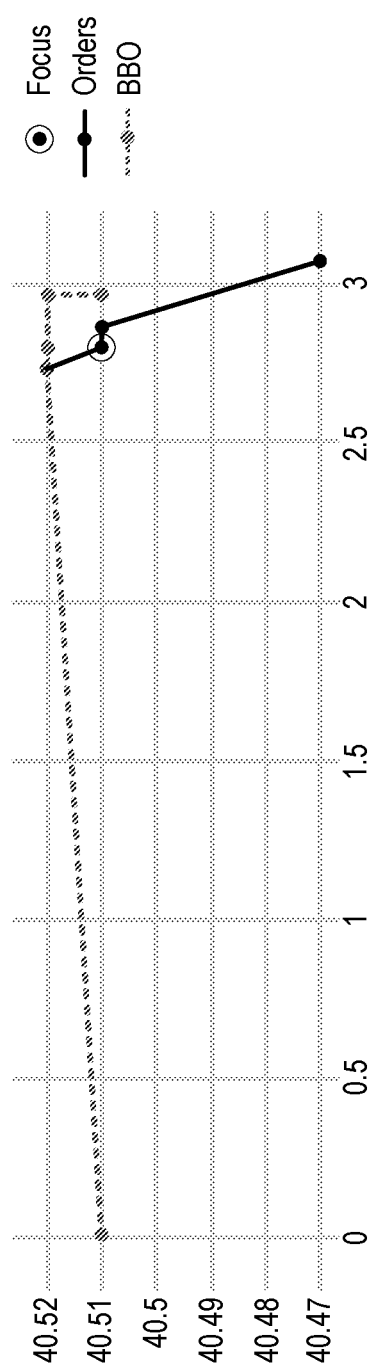

In another example, a model r aay identify patterns based on multiple time series. The multiple time series may include exchange orders and PBBO data. FIG. 9A illustrates positive samples of a PBBO moving order in which the order price equals the next PBBO price and the prevailing PBBO price is lower than the next PBBO price. FIG. 9B provides a negative sample in which there is no PBBO moving order. Machine- learning component 454 may use a fully connected neural network to train a model. The neural network may include additional convolution layers for feature learning to improve accuracy.

Figure 10A:
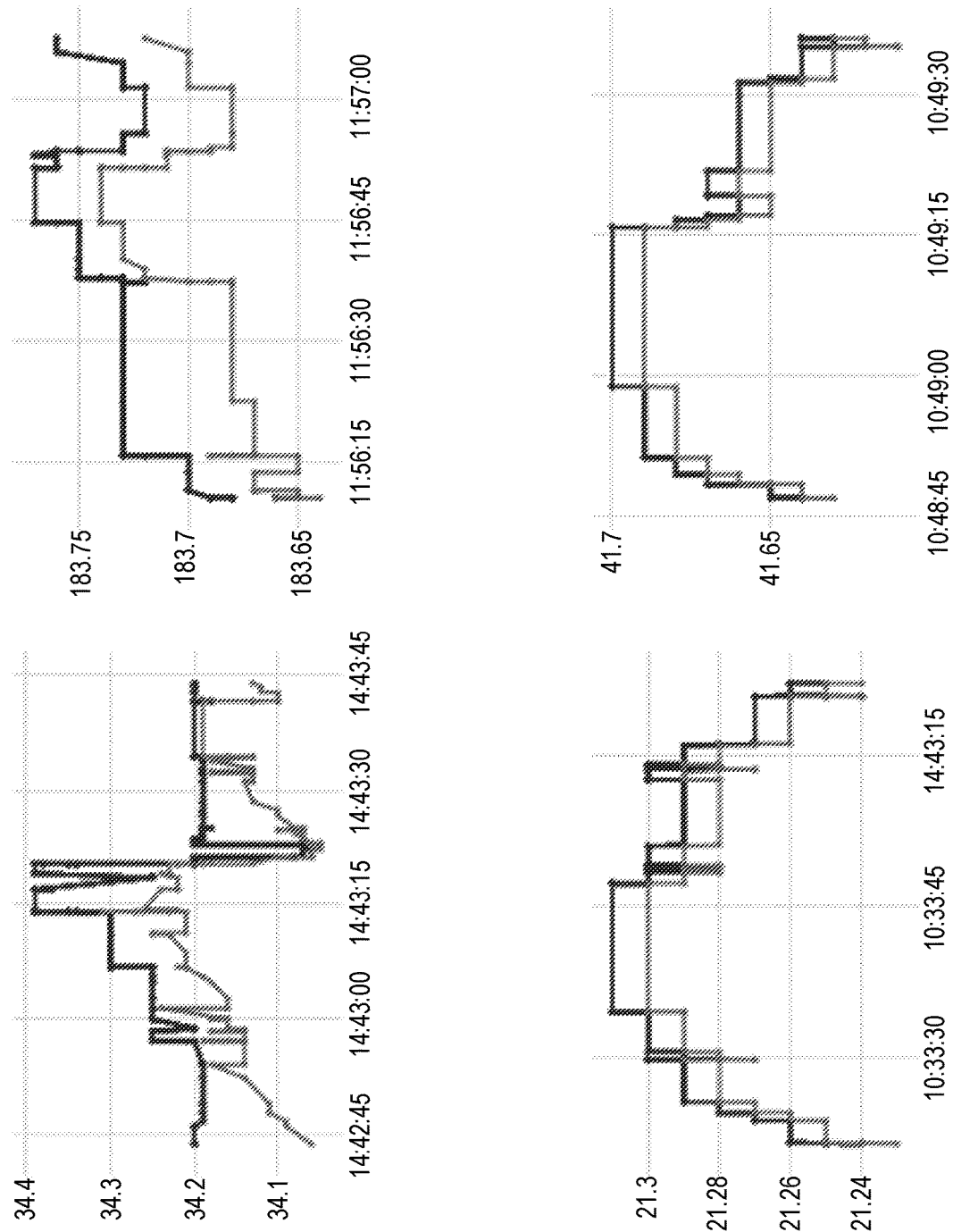
FIG. 10A illustrates examples of gaming behavior.

In one example, pattern recognition system 202 may detect gaming market manipulation. Gaming is a strategy for changing national best bid and offer (NBBO) on one side of the market with the intention to profit on the other side. A hill shape, as shown in the graphs in FIG. 10A, may indicate gaming behavior.

Figure 10B:
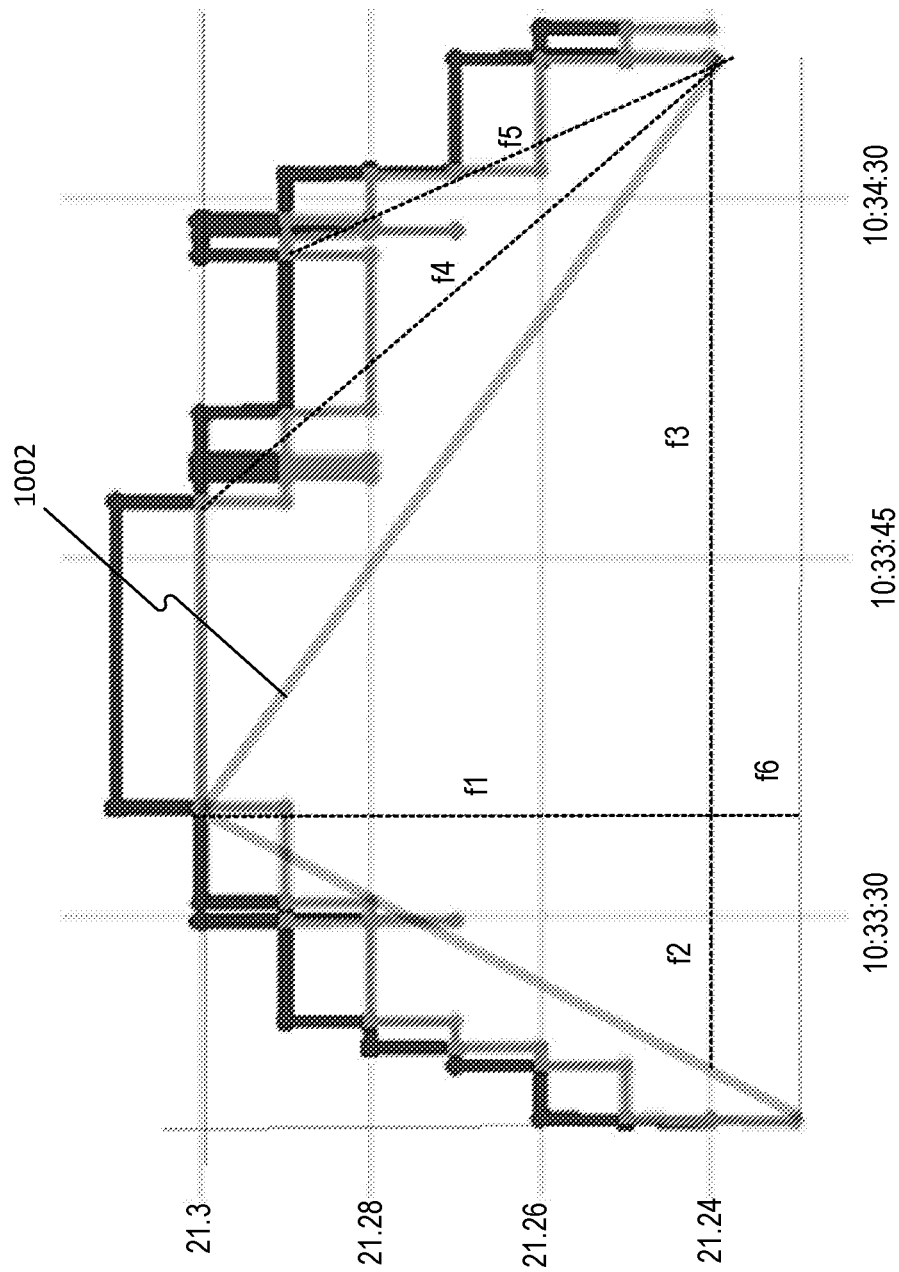
FIG. 10B illustrates features of data indicative of gaming behavior.

Conventional methods for identifying gaming may use traditional machine learning, not deep learning, to create features specific to that shape. Such methods, however, may not be able to analyze complex shapes and often require simplifying data, as shown by line 1002, which results in data loss. FIG. 10B illustrates exemplary features f1-f6 that may machine learning may generate for feature engineering based on rules. Exemplary features are min, max, midpoint, etc. of the data and/or the simplified data 1002.

The features in FIG. 10B may be used to train a classifier. The classifier may be a Random Forest machine-learning model or a Decision Tree classifier.

Identifying patterns indicating gaming can pose a number of challenges. Transactions can occur at uneven time steps, the number of transactions in one minute can vary significantly between tens and thousands, and securities can be traded at different prices. In addition, mislabeled samples in the training data can confuse a model. Further, the raw data must be shaped before being fed into a neural network as a neural network uses a fixed-size tensor as input.

Data-formatting component 452 may prepare and transform the raw time-series data into a tensor. Because the number of positive samples is usually smaller than the number of negative samples in market data, the training data may include one randomly selected negative sample for each positive sample to maintain a balanced training set. In some embodiments, deep learning or augmented-machine learning may generate labeled training data.

Figure 11:
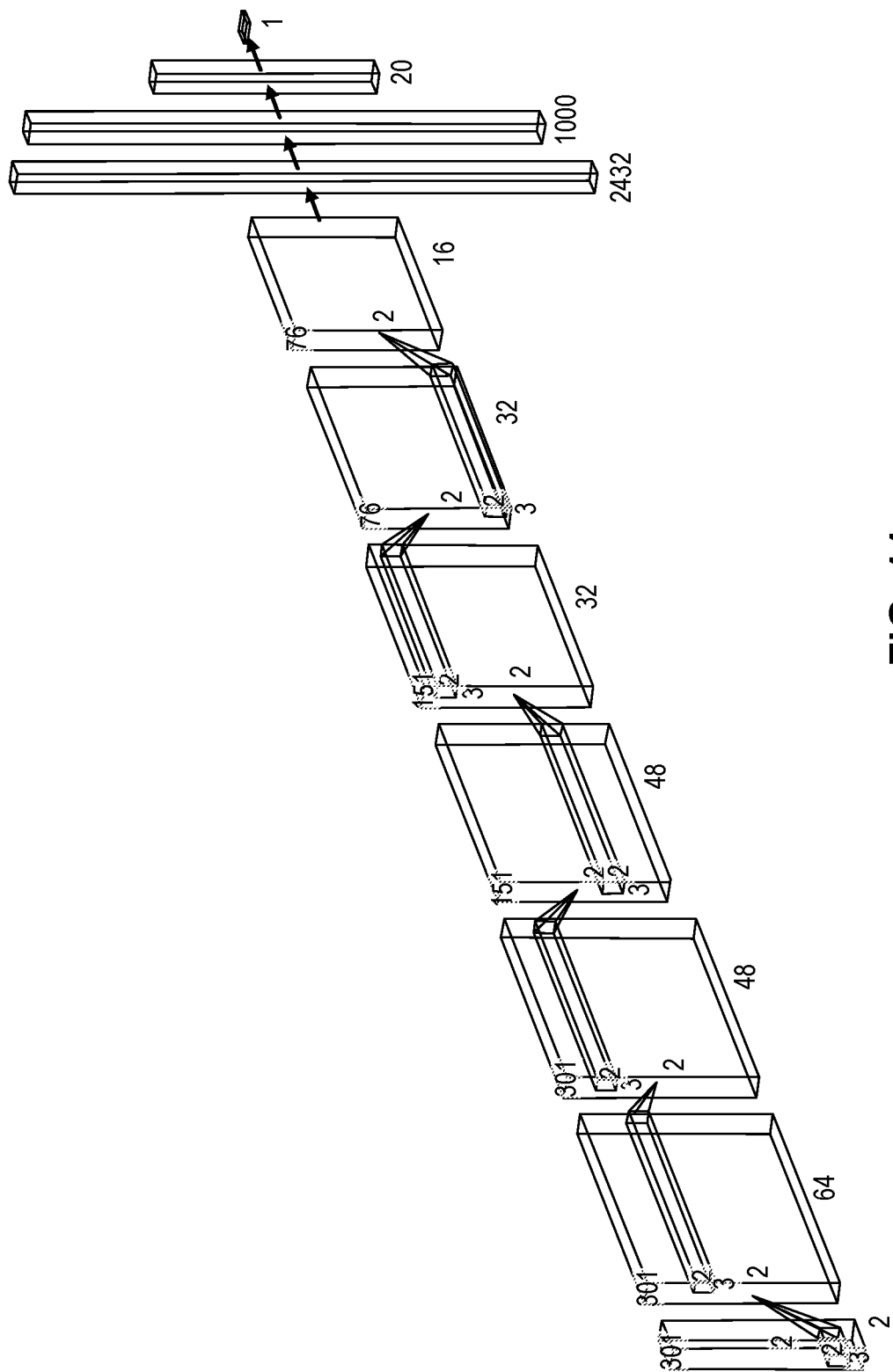
FIG. 11 is a neural network topology consistent with the invention.

FIG. 11 shows the topology of a feature-learning network 1100. Network 1100 may include various combinations of layers, filters, strides, etc. as shown in FIG. 11. Network 1100 may be in machine-learning component 454 and may receive tensor data from data formatting component 452. The output of the network 1100 may be passed to a fully connected network, such as a generative-adversarial network (GAN), to confirm correct learning or detect anomalies. The configuration of the network may vary depending on the pattern to be identified. For example, the network geometry may depend on the task to be performed, e.g., image recognition.

The network may be trained on the training data set, including positive and negative samples, and may use Adam optimizer, tan h activation, or mean-squared error loss functions. For example, the network may train a model to recognize bid-side price improvement. Because the training method is shape-agnostic, disclosed methods may be used to train a number of models to identify different shapes.

Figure 12:
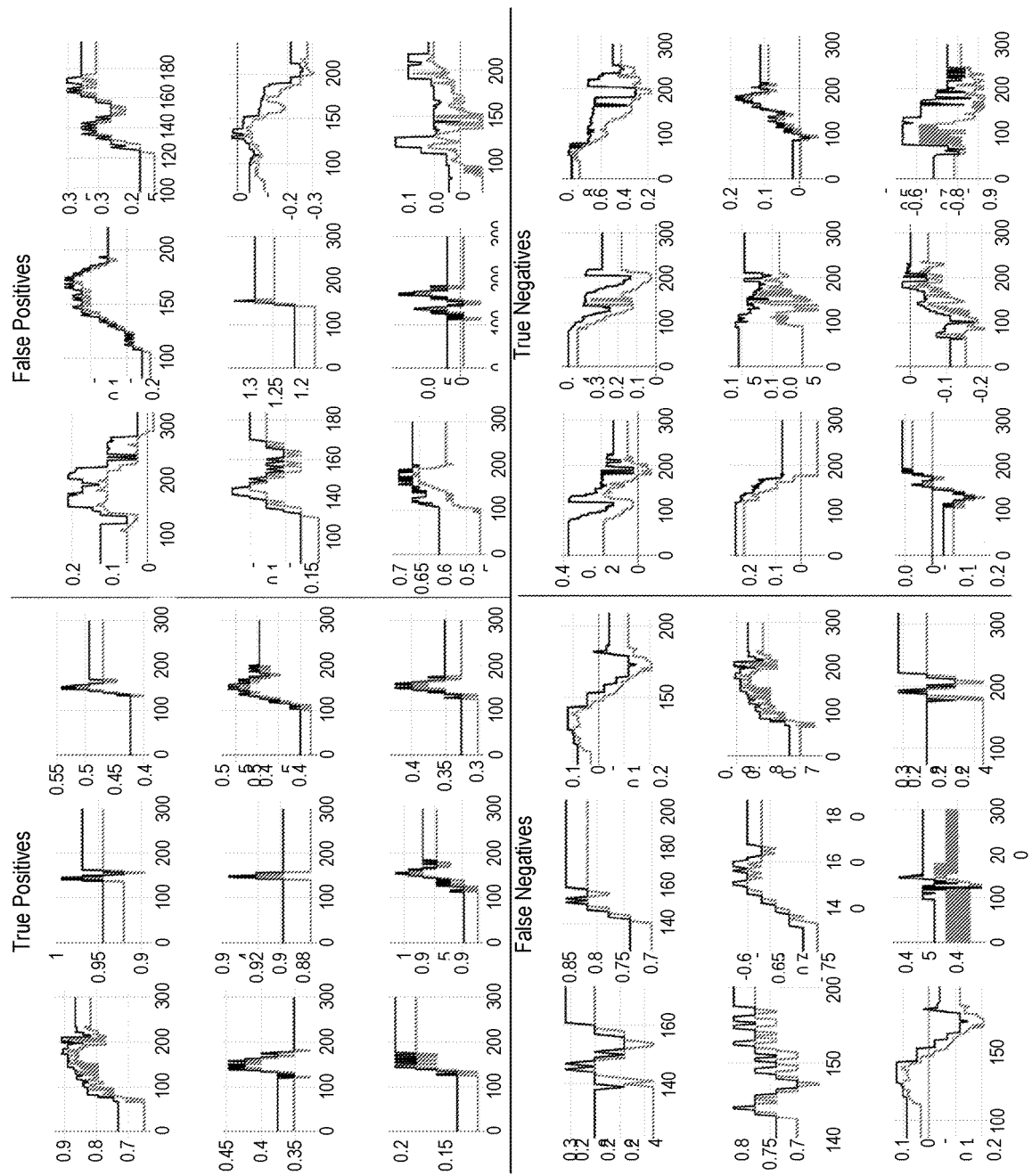
FIG. 12 is a confusion matrix of training data consistent with the invention.

In this example, the model achieved 85% accuracy on the test data set. FIG. 12 is a confusion matrix illustrating the results of the model as compared to a ground truth.

Figure 13A:
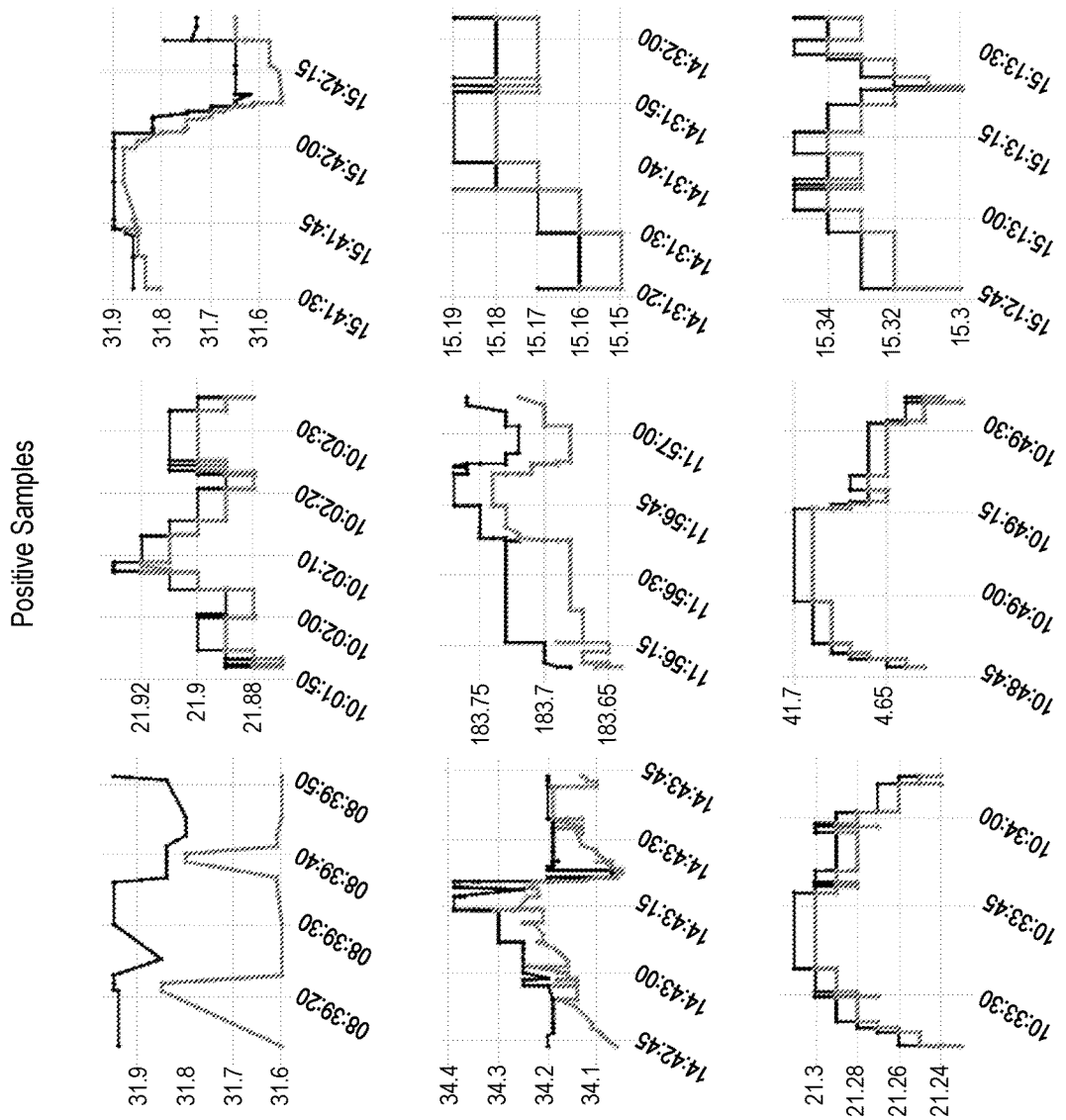
FIG. 13A illustrates positively identified samples.
Figure 13B:
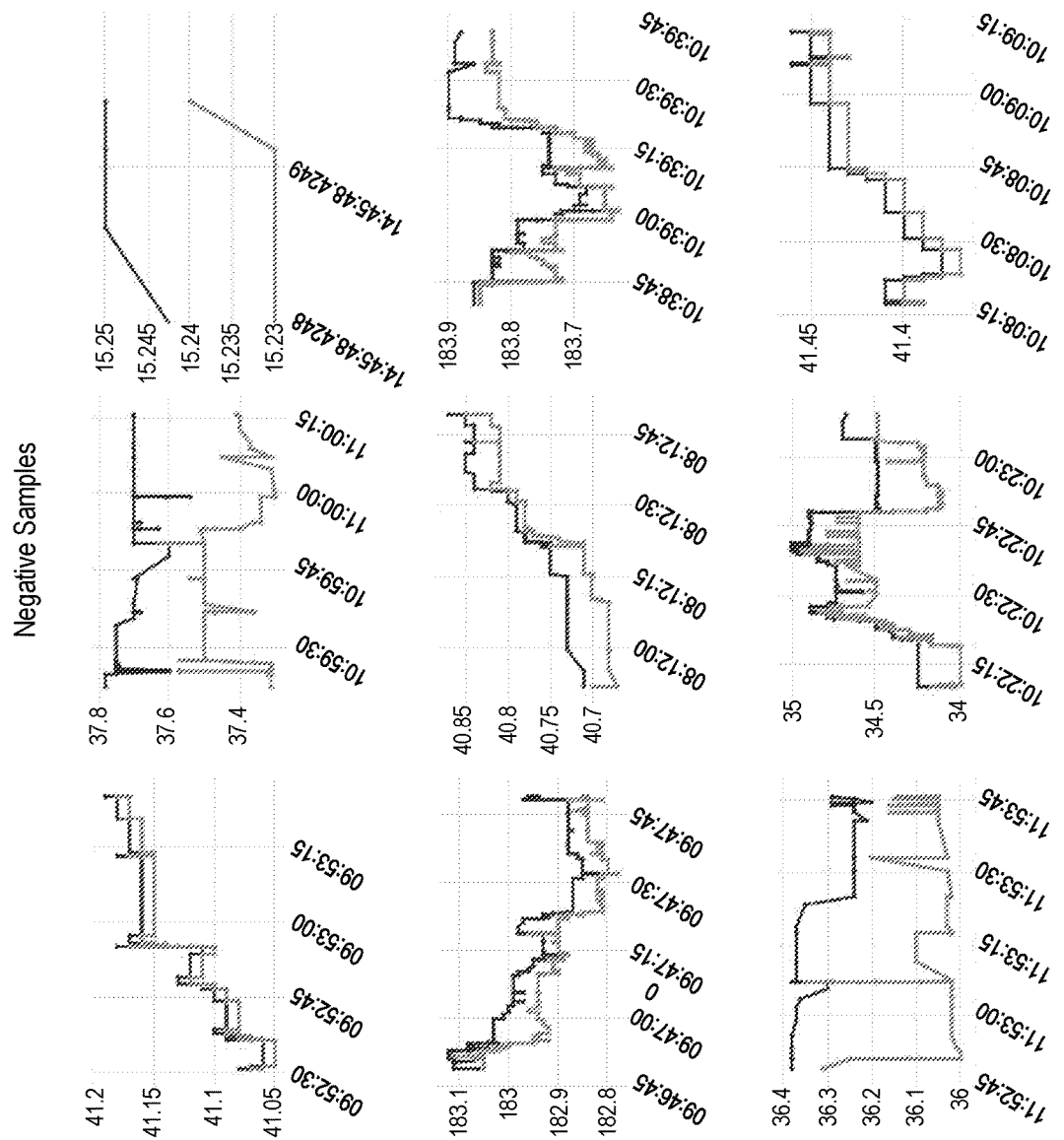
FIG. 13B illustrates negatively identified samples.

Machine-learning component 454 may classify data by applying the trained model to real data from market interface 204. FIGS. 13A and 13B illustrates positively identified samples and negatively identified samples, respectively, from applying the trained model to a full day of data using different strides. The stride length may be based on the intended application or the type of pattern to be identified. For example, smaller strides may overlap, allowing for detection of complex patterns. In some embodiments, machine-learning component 454 may apply several different shape recognition models to the same data to identify different manipulations. In other embodiments, a recurrent neural network (RNN) performs the classification.

In some embodiments, machine-learning component 454 correlates periods of manipulations with trading activity to identify the firms responsible for the manipulation behaviors. For example, in the gaming example, most firms may reduce trading activity during periods of gaming, while some firms showed increased activity during the identified periods. This may indicate that these firms were seeking an advantage during a period of gaming or these firms caused the market to change PBBO.

Figure 14:
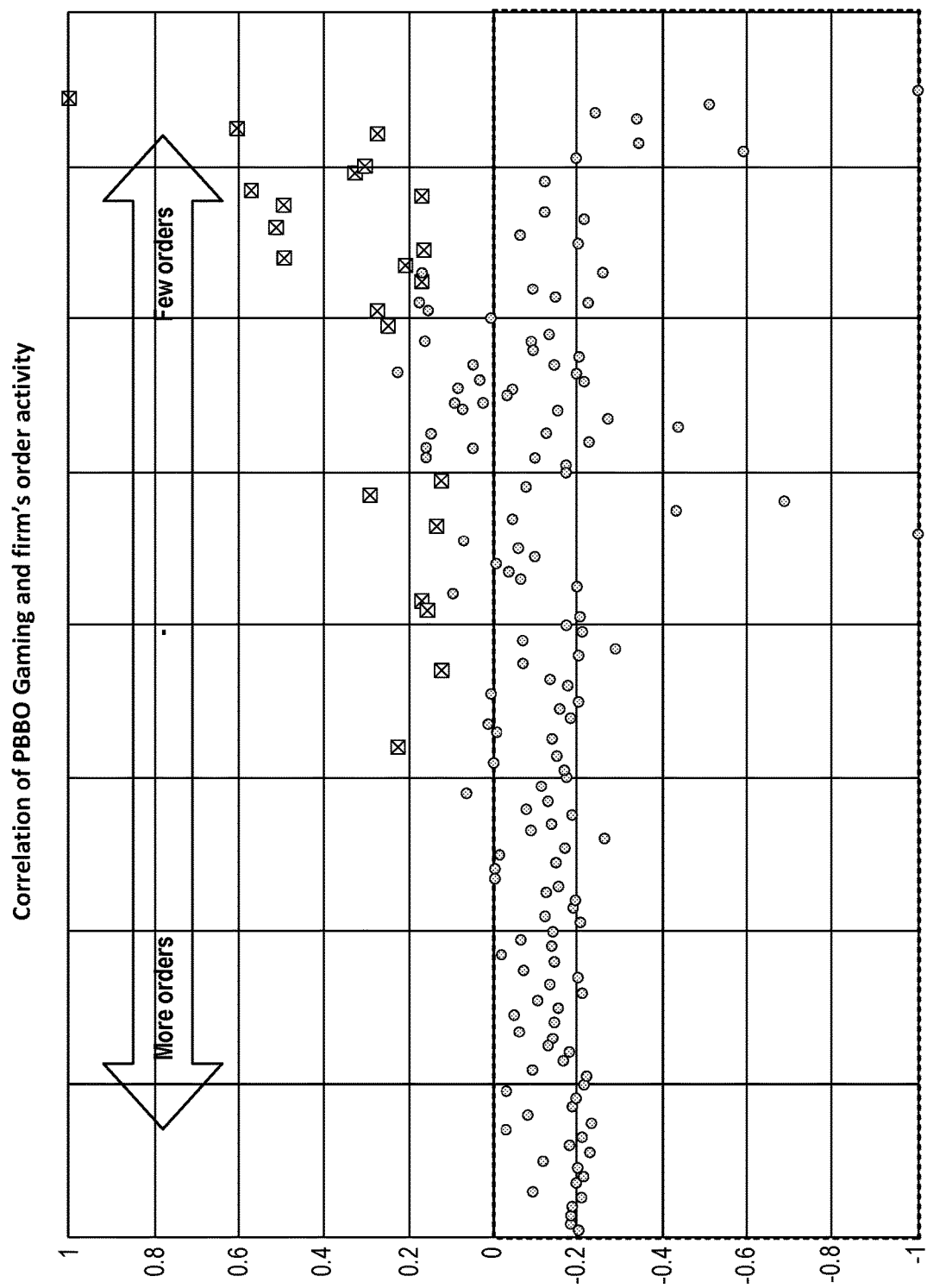
FIG. 14 is a graph of market participant data.

FIG. 14 shows a graph 1400 of the correlation between each firm's order activity and gaming intervals detected by the model. Graph 1400 or a list of entities suspected of gaming may be output to a user via an interface of user device 206. Entities suspected of gaming may be identified by applying a threshold, such as a minimum number of trades or orders, above which a firm may be engaging in a manipulation behavior.

Figure 15:
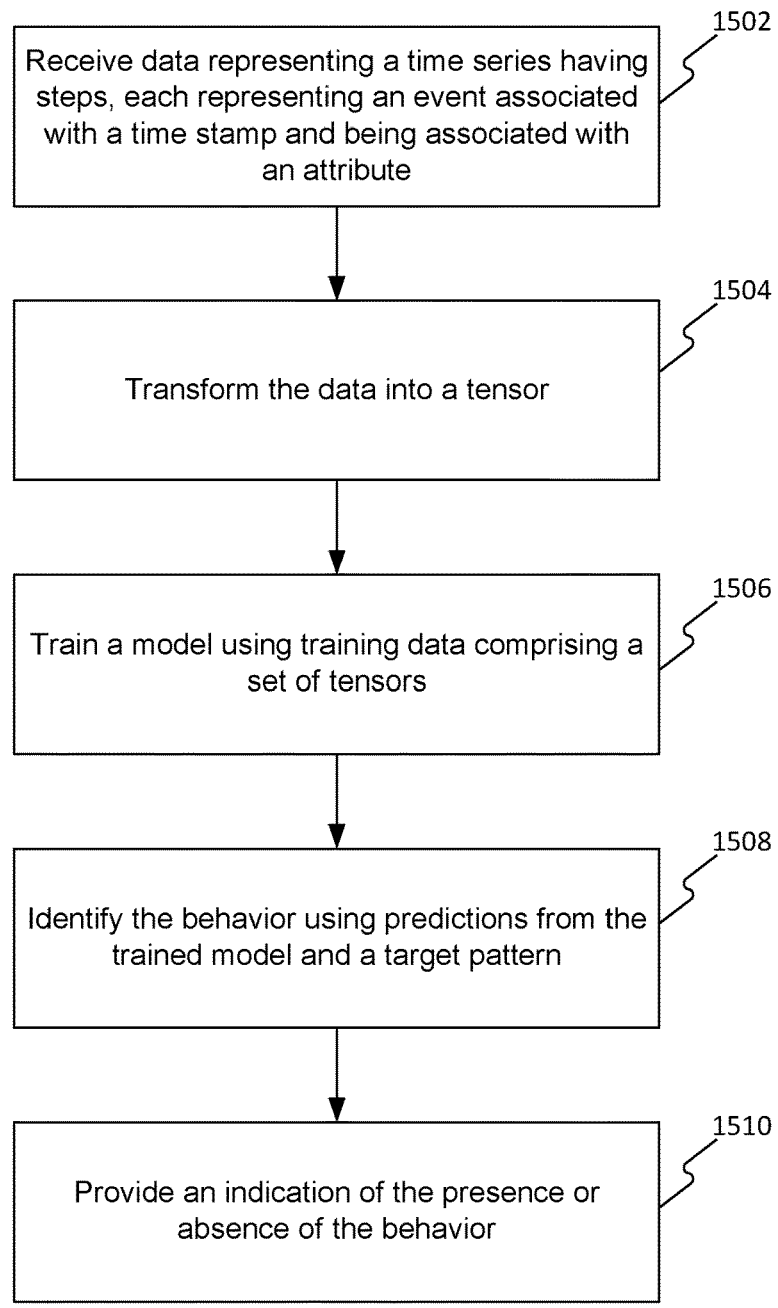
FIG. 15 is a process diagram consistent with the invention.

FIG. 15 is a flow chart of a method 1500 consistent with invention for identifying a pattern in multivariate time-series data. System 200 can implement method 700. In this example, the target behavior is market manipulation and system 200 receives the selection via a GUI on a user device, e.g., user device 206.

At step 1502, system 200, particularly pattern recognition system 202, receives data representing a time series having steps each step representing an event associated with a time stamp and with one or more attributes. In this example, pattern recognition system 202 receives from market interface 204 market data including exchange data and transactional data.

At step 1504, the system transformsthe data into a tensor representing the number of time steps of the time series, the number of time series in the data, and the number of attributes in the data. Data formatting component 452 may prepare the data for shaping based on one or more parameters of the tensor. For example, a neural network may require a tensor of a fixed size. Thus, data formatting component 452 may trim or pad the received data such that it may be shaped into a tensor having the required parameters.

At step 1506, the system trains a model using training data comprising a set of tensors each tensor with a binary classifier, The binary classifier indicates whether the tensor includes a positive or negative sample. Machine-learning component 454 may receive training data including tensors generated based on positive and negative examples of the behavior of interest. In some embodiments, the model is trained using a neural network.

At step 1508, the system identifies the behavior using predictions from the trained machine-learning model and a target pattern. Machine-learning component 454 may apply the trained model of step 1506 to a tensor generated based on received data.

At step 1510, the system provides an indication of the presence or absence of the behavior. The system may also provide graphical representations of the identified pattern and the associated market data. In some embodiments, the system correlates market participant activity to the identified pattern for the period associated with the detected behavior. The system may display this correlation information to a user via user device 206. In some embodiments, the system generates a list of firms that may be associated with market manipulation behaviors based on a threshold amount of activity during the period of the detected behavior.

It will be apparent to those skilled in the art that various modifications and variations can be made to the disclosed systems and methods. Other embodiments will be apparent to those skilled in the art from consideration of the specification and practice of the disclosed systems and methods. The specification and examples are only exemplary, with the invention's true scope being in the following claims and their equivalents.

What is claimed is:

1. A system for identifying a behavior associated with game theory in multivariate time-series data, comprising:
an input device to provide the data;
an output device to provide an indication of the behavior;
a memory device storing instructions to identify a target pattern associated with the behavior; and
a processor to execute the instructions to cause the system to
receive, via the input device, data representing a set of time series, a number of time steps in each time series, and one or more attributes of the data, wherein the one or more attributes include bid and ask information;
transform the data into a tensor comprising a three-dimensional structure having a pattern comprising bid, ask, and time information, wherein:
the pattern represents a bid price and an ask price at a specific time in a time interval;
the time information is encoded as a time delta, wherein the time delta is a time difference between a current entry in the tensor and a preceding entry in the tensor; and
the tensor includes two or more time deltas;
train a supervised machine-learning model configured to generate a target set of features associated with the target pattern using training data comprising a set of tensors, wherein each tensor includes
a training pattern comprising bid, ask, and time information, wherein the training pattern represents real data including a training bid price and a training ask price at a specific training time in a training time interval, and a label indicating whether the training pattern includes the target pattern, wherein the trained machine-learning model is configured to receive the tensor as input, extract a set of features from the pattern of the tensor using image analysis techniques, and determine whether the set of features associated with the pattern of the tensor matches the target set of features associated with the target pattern;

identify the behavior by applying the trained machine-learning model and the target pattern;

output a classification associated with a presence or absence of the target pattern; and provide an indication of the presence or absence of the behavior via the output device.

2. The system of claim 1, wherein the attributes include price or quantity.

3. The system of claim 1, wherein the target pattern represents a behavior in a market.

4. The system of claim 1, wherein the processor is further configured to execute instructions to prepare the data based on a parameter of the tensor.

5. The system of claim 1, wherein the behavior is market manipulation.

6. The system of claim 1, wherein the tensor comprises a graphical three-dimensional structure having the training pattern and comprising bid, ask, and time information over the time interval.

7. The system of claim 1, wherein the machine-learning model includes a deep-learning neural network.

8. The system of claim 1, wherein the instructions to provide the indication include instructions to display a graphical representation of the target pattern via an interface of a user device.

9. The system of claim 1, wherein the instructions to transform the data into a tensor comprises instructions to normalize the received data based on a z-score or a minimum-maximum scaling.

10. The system of claim 1, wherein the instructions to provide the indication include instructions to:

identify a period of the behavior in the received data; and correlate market participant activity during the period to the target pattern.

11. The system of claim 10, wherein the processor is further configured to execute instructions to display a graphical representation of the correlation by showing market-participant information.

12. The system of claim 10, wherein the processor is further configured to execute instructions to generate a list of entities engaged in the behavior based on a threshold amount of activity.

13. The system of claim 1, wherein transforming the data into a tensor includes at least one of trimming, padding, or manipulating the data into the three-dimensional structure.

14. A method for identifying a behavior associated with game theory in multivariate time-series data, comprising:

receiving, from an input device, data representing a set of time series, a number of time steps in each time series, and one or more attributes of the data, wherein the one or more attributes include bid and ask information;

transforming the data into a tensor comprising a three-dimensional structure having a pattern comprising bid, ask, and time information, wherein:

the pattern represents a bid price and an ask price at a specific time in a time interval;

the time information is encoded as a time delta, wherein the time delta is a time difference between a current entry in the tensor and a preceding entry in the tensor; and the tensor includes two or more time deltas;

training a supervised machine-learning model configured to generate a target set of features associated with a target pattern using training data comprising a set of tensors, wherein each tensor includes a training pattern comprising bid, ask, and time information, wherein the training pattern represents real data including a training bid price and a training ask price at a specific training time in a training time interval, and a label indicating whether the training pattern includes the target pattern associated with the behavior, wherein the trained machine-learning model is configured to receive the tensor as input, extract a set of features from the pattern of the tensor using image analysis techniques, and determine whether the set of features associated with the pattern of the tensor matches the target set of features associated with the target pattern associated with the behavior;

identifying the behavior by applying the trained machine-learning model and the target pattern;

output a classification associated with a presence or absence of the target pattern; and providing an indication of the presence or absence of the behavior to an output device.

15. The method of claim 14, wherein the attributes include price or quantity.

16. The method of claim 14, wherein the target pattern represents a behavior in a market.

17. The method of claim 14, wherein the tensor comprises a graphical three-dimensional structure having the training pattern and comprising bid, ask, and time information over the time interval.

18. The method of claim 14, wherein the method further comprises preparing the data based on a parameter of the tensor.

19. The method of claim 14, wherein the behavior is market manipulation.

20. The method of claim 14, wherein the machine-learning model includes a deep-learning neural network.

21. The method of claim 14, wherein providing the indication includes displaying a graphical representation of the target pattern.

22. The method of claim 14, wherein transforming the data into a tensor comprises normalizing the received data based on a z-score or a minimum-maximum scaling.

23. The method of claim 14, wherein providing an indication of the presence or absence of the behavior comprises:

identifying a period of the behavior in the received data; and correlating market participant activity during the period to the target pattern.

24. The method of claim 23, wherein the method further comprises:

displaying a graphical representation of the correlation by showing market-participant information.

25. The method of claim 23, wherein method further comprises generating a list of entities engaged in the behavior based on a threshold amount of activity.

26. A non-transitory computer-readable medium comprising instructions configured to cause at least one processor to perform a method comprising:

receiving, from an input device, data representing a set of time series, a number of time steps in each time series, and one or more attributes of the data, wherein the one or more attributes include bid and ask information;

transforming the data into a tensor comprising a three-dimensional structure having a pattern comprising bid, ask, and time information, wherein:

the pattern represents a bid price and an ask price at a specific time in a time interval;

the time information is encoded as a time delta, wherein the time delta is a time difference between a current entry in the tensor and a preceding entry in the tensor; and the tensor includes two or more time deltas;

training a supervised machine-learning model configured to generate a target set of features associated with the target pattern using training data comprising a set of tensors, wherein each tensor includes a training pattern comprising bid, ask, and time information, wherein the training pattern represents real data including a training bid price and a training ask price at a specific training time in a training time interval, and a label indicating whether the training pattern includes a target pattern associated with the behavior, identifying a behavior associated with game theory by applying the trained machine-learning model and the target pattern, wherein the trained machine-learning model is configured to receive the tensor as input, extract a set of features from the pattern of the tensor using image analysis techniques, and determine whether the set of features associated with the pattern of the tensor matches the target set of features associated with the target pattern associated with the behavior;

output a classification associated with a presence or absence of the target pattern; and providing an indication of the presence or absence of the behavior to an output device.

* * * * *